Aug. 28, 1962 M. WITZENBURG 3,051,459
APPARATUS AND PROCESS FOR AGITATING STORED GRAIN
Filed Dec. 24, 1959

INVENTOR.
MARION WITZENBURG
BY
ATTORNEYS

United States Patent Office 3,051,459
Patented Aug. 28, 1962

3,051,459
APPARATUS AND PROCESS FOR AGITATING STORED GRAIN
Marion Witzenburg, Dunkerton, Iowa
Filed Dec. 24, 1959, Ser. No. 861,868
4 Claims. (Cl. 262—14)

The present invention is an apparatus and process for agitating stored grain.

As is well known, the United States Government has huge stocks of stored grain in privately owned warehouses and elevators and it is the responsibility of the owners of these warehouses and elevators to maintain the stored grain in good condition. These storage buildings vary in size from forty feet by one hundred and forty feet, to buildings sufficiently spacious to store millions of bushels of grain. Changes in weather conditions are factors in the formation of surface encrustations on the grain with resultant moisture leading to grain spoilage. Presently, the breaking of the crust is manually accomplished with rakes and shovels, entailing a great amount of labor.

After much experiment, I have found that the encrustation can be satisfactorily broken and loosened by a self-propelled machine with a great saving of labor. It is, therefore, an object of this invention to provide a power-operated machine which will move through the grain to positively break the crust and loosen the grain subjacent the crust to prevent reencrustation for protracted periods.

Other objects of the invention are to provide a self-propelled agitator which will move through the grain to effect the desired result without in any way contaminating the grain; to provide elongated members equipped with strategically positioned fingers of sufficient length to penetrate through the surface crust and dig into the grain mass for a considerable depth below the crust for optimum agitation; to provide a self-propelled agitator for stored grain, which includes a reversible motor, to permit fore and aft movement of the agitator, while in operation, the agitator being of a size and construction to permit its transportation from one warehouse to another; and to provide a relatively inexpensive agitator which may be operated with facility by anyone.

A further object of this invention is to provide an agitator, one embodiment of which includes a self-contained operating unit body completely enclosed and equipped with agitating fingers and a manipulating handle.

A still further object of this invention is to provide a process for breaking and loosening encrustations on grain stored in bulk, in addition to which the grain mass subjament the encrustation is agitated.

Other objects of the invention will be manifest from the following description of the present preferred forms of the invention, taken in connection with the accompanying drawings, wherein.

Figure 1:
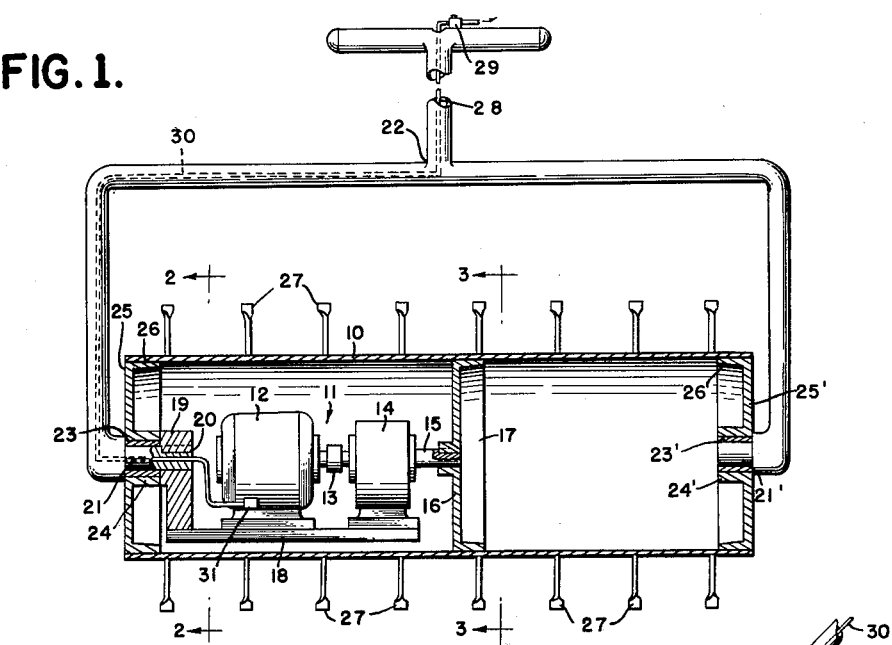
FIG. 1 is a top plan view of an agitator constructed in accordance with this invention, the cylinder of which is shown in longitudinal section to disclose details.
Figure 2:
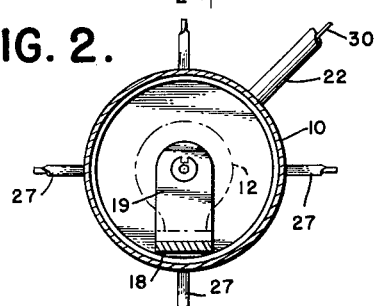
FIG. 2 is a vertical sectional view of the agitator taken on the line 2—2 of FIG. 1 looking in the direction of the arrows.
Figure 3:
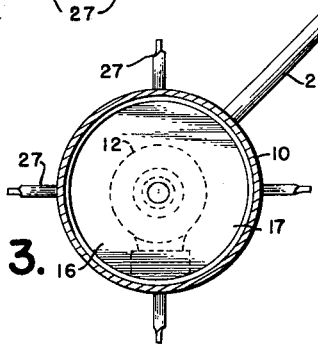
FIG. 3 is a vertical sectional view taken on the line 3—3 of FIG. 1 looking in the direction of the arrows.

The form of invention illustrated in FIG. 1 of the drawings includes an elongated cylinder or drum 10 which is adapted for the reception of a power plant, generally designated 11, the power plant including a reversible motor 12 operatively connected at one end, as indicated at 13, to a reducer 14. A drive shaft 15 extends from the reducer 14 and is keyed or otherwise fixedly secured to a plate 16, the latter being provided with an annulus 17 which in turn is fixedly secured to the inner periphery of the cylinder 10. The power plant is supported on a platform 18 carried by a stanchion 19 keyed, as indicated at 20, to the reduced end 21 of a handle 22. The reduced end 21 is solid, provided with a longitudinal bore, and mounted in a bearing 23 which is sleeved over the end 21 and secured to hub 24 of a discal head 25, the latter including an annulus 26 secured to the inner periphery of the cylinder 10. The end of the cylinder 10, opposite to that which carries the head 25 is closed by a discal head 25' of identical construction with the head 25 and includes an annulus 26' secured to the inner periphery of the cylinder. Additionally, the head 25' includes a hub 24' through which a solid reduced end 21' on handle 22 extends. A bearing 23' is sleeved over the reduced end 21' and is fixedly engaged with the hub 24' of the head 25'. The cylinder 10 carries a plurlity of rows of fingers or tines 27 arranged in staggered relation and of a length which will not only penetrate the encrustation of the grain mass but will dig into the grain mass subjacent the encrustation. The handle 22 is tubular, except for the solid ends 21 and 21' for the reception of an electrical cable 28 which extends to a suitable source of electrical energy, the circuit wires of the cable being in operative connection with a switch 29 mounted on a part of the handle 22. Cable 28 extends through one side of the handle, as indicated by the dotted lines 30, and engaged to the motor 12, as indicated at 31. The cable may be of any desired length so as to permit movement of the agitator a predetermined distance.

Figure 4:
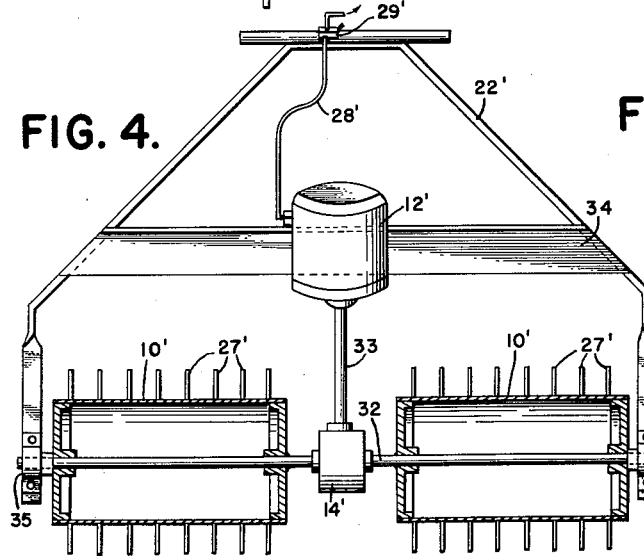
FIG. 4 is a top plan view of a modified form of the agitator employing multiple agitator cylinders shown in longitudinal section.
Figure 5:
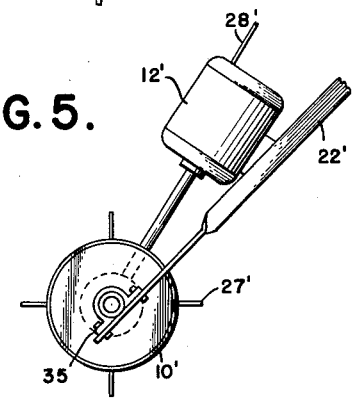
FIG. 5 is an end elevational view of the form of invention shown in FIG. 4, the handle being fragmentarily shown.

In the modification of the invention shown in FIG. 4, multiple cylinders 10' are employed which carry fingers or tines 27', the cylinders being arranged in horizontal alignment, in spaced relation, and equipped with a driven shaft 32 extending axially through the cylinders and welded, or otherwise fixedly secured, to the closed ends of the cylinders 10'. The shaft 32 carries a right angle reducer 14' with which one end of a drive shaft 33 is engaged, the opposite end of the drive shaft being in operative engagement with the motor 12'. The motor 12' is supported on a cross bar 34 which spans the distance between the sides of a handle 22'. The free ends of the handle 22' are provided with bearing blocks 35 in which the opposite ends of the shaft 32 are rotatably mounted. The motor 12' is in circuit with a suitable source of energy through electrical cable 28' extending through switch 29'.

In operation the cylinder 10 or cylinders 10' are operated over the stored grain and, since the motors 12 and 12' are reversible, the cylinder may be moved fore and aft at the option of the operator through control switches 29 and 29', respectively. It has been found, from experiment, that with the device of this invention the fingers or tines will effectively penetrate any grain encrustation and, in addition, will loosen the grain to an appreciable depth below the crust to establish "breathing" spaces for the grain. The cylinder or cylinders may be made of any desired length and their direction of movement is manually controlled by the handles 22 and 22'. The hollow cylinder or cylinders provide the necessary buoyancy to prevent the agitator entity from sinking into the grain mass and provides a relatively inexpensive machine which permits expeditious processing of encrusted grain by one workman.

While I have herein shown and described the preferred embodiments of my invention, it is nevertheless to be understood that various changes may be made therein without departing from the spirit and scope of the appended claims.

What I claim is:

1. An apparatus for agitating stored grain comprising a cylinder, a plate mounted in and secured to the cylinder, a power plant mounted in the cylinder, including a moving part in operative engagement with said plate, to effect rotation of the cylinder when the power plant is in operation, fingers extending from said cylinder, the fingers being elongated to penetrate through the grain crust into the mass subjacent the crust to establish breathing spaces for the grain, said cylinder being hollow to provide the necessary buoyance for preventing the agitator entity from sinking into the grain mass.

2. The apparatus of claim 1, with the addition of a handle with terminals engaged with the ends of the cylinder, a part of the handle and one of its ends being hollow, and electric wires extending through said hollow part of the handle for placing said power plant in circuit with a source of energy at a point remote from the handle, to energize the power plant.

3. The apparatus of claim 1 with the addition of a platform pendently mounted in the cylinder beneath the power plant to support the latter in spaced relation to the inner periphery of the cylinder.

4. The apparatus of claim 1 in which the power plant includes a motor, a reducer in operative connection with the motor, and a drive shaft extending from the reducer, the end of the shaft remote from the reducer being secured to said plate to effect rotation of the cylinder when the motor operates, said motor being reversible to permit forward and aft movement of the cylinder over the grain at the option of the operator.

References Cited in the file of this patent

UNITED STATES PATENTS

| | | |
|---|---|---|
| 1,101,201 | Linderoth | June 23, 1914 |
| 1,704,263 | Scheckler | Mar. 5, 1929 |
| 1,715,235 | Hearn | May 28, 1929 |
| 1,825,119 | Mug | Sept. 29, 1931 |
| 2,400,204 | Lindskog | May 14, 1946 |
| 2,676,002 | Wolfe | Apr. 20, 1954 |
| 2,709,220 | Spector | May 24, 1955 |
| 2,765,157 | Hanson | Oct. 2, 1956 |
| 2,816,495 | Brooks | Dec. 17, 1957 |
| 2,823,587 | Kelsey | Feb. 18, 1958 |
| 2,866,422 | Colson | Dec. 30, 1958 |
| 2,903,077 | Kamlukin | Sept. 8, 1959 |